(12) United States Patent
Zlotin et al.

(10) Patent No.: US 11,494,653 B2
(45) Date of Patent: Nov. 8, 2022

(54) NEURAL NETWORK AND METHOD OF NEURAL NETWORK TRAINING

(71) Applicant: Progress, Inc., West Bloomfield, MI (US)

(72) Inventors: Boris Zlotin, West Bloomfield, MI (US); Dmitri Pescianschi, Quedlinburg (DE); Vladimir Proseanic, West Bloomfield, MI (US)

(73) Assignee: Progress, Inc.

( * ) Notice: Subject to any disclaimer, the term of this patent is extended or adjusted under 35 U.S.C. 154(b) by 685 days.

(21) Appl. No.: 16/523,584

(22) Filed: Jul. 26, 2019

(65) Prior Publication Data

US 2020/0019862 A1    Jan. 16, 2020

Related U.S. Application Data

(63) Continuation-in-part of application No. 15/449,614, filed on Mar. 3, 2017, now Pat. No. 10,423,694, which is a continuation-in-part of application No. 15/178,137, filed on Jun. 9, 2016, now Pat. No. 9,619,749, which is a continuation-in-part of application No. 14/862,337, filed on Sep. 23, 2015, now Pat. No. 9,390,373, which is a continuation of
(Continued)

(51) Int. Cl.
*G06N 3/08* (2006.01)
*G06K 9/62* (2022.01)

(52) U.S. Cl.
CPC .......... *G06N 3/082* (2013.01); *G06K 9/6256* (2013.01)

(58) Field of Classification Search
CPC ............................ G06N 3/082; G06K 9/6256
See application file for complete search history.

(56) References Cited

U.S. PATENT DOCUMENTS 5,600,843 A    2/1997   Kato et al.

OTHER PUBLICATIONS

Pérez-Sánchez, Beatriz, et al. "An online learning algorithm for adaptable topologies of neural networks." Expert Systems with Applications 40.18 (2013): 7294-7304. (Year: 2013).*

(Continued)

*Primary Examiner* — Eric Nilsson
(74) *Attorney, Agent, or Firm* — Quinn IP Law (57) ABSTRACT

A neural network includes inputs for receiving input signals, synapses connected to the inputs and having corrective weights, and neurons having outputs connected with the inputs via the synapses. Each neuron generates a neuron sum by summing corrective weights selected from the respective synapse. A controller receives a desired output signal, determines a deviation of the neuron sum from the desired output signal value, and modifies respective corrective weights using the determined deviation. Adding up the modified corrective weights to determine the neuron sum minimizes the deviation and trains the network. A structure-forming module rearranges connections between network elements during the training and a signal allocation module distributes the input signals among the network elements during the training. A training module commands and coordinates operation of the structure-forming and the signal allocation modules and the controller to reorganize the network structure during the training to control the training in real time in real-time.

20 Claims, 5 Drawing Sheets

Related U.S. Application Data application No. PCT/US2015/019236, filed on Mar. 6, 2015.

(60) Provisional application No. 62/173,163, filed on Jun. 9, 2015, provisional application No. 62/106,389, filed on Jan. 22, 2015, provisional application No. 61/949,210, filed on Mar. 6, 2014.

(56) References Cited

OTHER PUBLICATIONS

Yu-Yi Liao, Jzau-Sheng Lin, Shen-Chuan Tai, "CMAC With Clustering Memory and Its Application to Facial Expression Recognition", 2011, International Journal of Pattern Recognition and Artificial Intelligence, vol. 25, No. 7, p. 1055-1072.
International search report for international application No. EP17811082.
International OA for international application No. CA2,941,352.
Farshandi et al., "Face Detection Using CMAC Neural Network", Artificiat Intelligence and Soft Computing, ICAISC 2004, Lecture Notes in Computer Science,3070, p. 724-729, Jun. 7, 2004.

\* cited by examiner

NEURAL NETWORK AND METHOD OF NEURAL NETWORK TRAINING

CROSS-REFERENCE TO RELATED APPLICATION(S)

This application is a continuation-in-part of U.S. Utility application Ser. No. 15/449,614 filed Mar. 3, 2017, which is a continuation-in-part of U.S. Utility Bypass application Ser. No. 15/178,137 filed Jun. 9, 2016, which is a continuation-in-part of U.S. Utility Bypass application Ser. No. 14/862,337 filed Sep. 23, 2015, and is a continuation of International Application Serial No. PCT/US 2015/19236 filed Mar. 6, 2015, which claims the benefit of U.S. Provisional Application Ser. No. 61/949,210 filed Mar. 6, 2014, and U.S. Provisional Application Ser. No. 62/106,389 filed Jan. 22, 2015, and also claims the benefit of U.S. Provisional Application Ser. No. 62/173,163 filed Jun. 9, 2015, the entire content of which is similarly incorporated by reference.

INTRODUCTION

The disclosure relates to an artificial neural network and a method of training the same.

In machine learning, the term "neural network" generally refers to software and/or computer architecture, i.e., the overall design or structure of a computer system or a microprocessor, including the hardware and software required to run it. Artificial neural networks may be a family of statistical learning algorithms inspired by biological neural networks, a.k.a., the central nervous systems of animals, in particular the brain. Artificial neural networks are primarily used to estimate or approximate generally unknown functions that may depend on a large number of inputs. Such neural networks have been used for a wide variety of tasks that are difficult to resolve using ordinary rule-based programming, including computer vision and speech recognition.

Artificial neural networks are generally presented as systems of "neurons" which may compute values from inputs, and, as a result of their adaptive nature, are capable of machine learning, as well as pattern recognition. Each neuron frequently connects with several inputs through synapses having synaptic weights.

Neural networks are not programmed as typical software and hardware, but are trained. Such training is typically accomplished via analysis of a sufficient number of representative examples and by statistical or algorithmic selection of synaptic weights, so that a given set of input images corresponds to a given set of output images. A common criticism of classical neural networks is that significant time and other resources are frequently required for their training.

Various artificial neural networks are described in the following U.S. Pat. Nos. 4,979,124; 5,479,575; 5,493,688; 5,566,273; 5,682,503; 5,870,729; 7,577,631; and 7,814,038.

SUMMARY

An operative structure of a neural network includes a plurality of inputs of the neural network, each input configured to receive an input signal having an input value. The neural network operative structure also includes a plurality of synapses. Each synapse is connected to one of the plurality of inputs and includes a plurality of corrective weights. Each corrective weight is defined by a weight value, and each synapse communicates weight signals indicative of weight values of the corrective weights. The neural network operative structure also includes a set of neurons. Each neuron has at least one output and is connected with at least one of the plurality of inputs via at least one of the plurality of synapses. Each neuron is also configured to receive the weight signals from the at least one of the plurality of synapses and add up the weight values of the corrective weights selected from each synapse connected to the respective neuron and thereby generate a neuron sum.

The neural network operative structure additionally includes a controller configured to receive a desired output signal having a value, determine a deviation of the neuron sum from the desired output signal value. The controller is additionally configured to modify respective corrective weight values using the determined deviation, such that adding up the modified corrective weight values to determine the neuron sum minimizes the deviation of the neuron sum from the desired output signal value to thereby train the neural network. The neural network operative structure also includes a structure-forming module configured to selectively arrange and rearrange connections between neural network elements during the training of the neural network. The subject neural network elements include the plurality of inputs, the set of neurons, and the plurality of synapses. The neural network operative structure additionally includes a signal allocation module configured to distribute the input signals among the neural network elements during the training of the neural network. The neural network operative structure further includes a training module configured to command and coordinate operation of the controller, the structure-forming module, and the signal allocation module to reorganize the operative structure of the neural network during the training of the neural network to thereby control, in real-time, the training of the neural network.

The signal allocation module may be further configured to select one or more corrective weights from the plurality of corrective weights in correlation with the input value.

The neural network operative structure may additionally include a set of distributors. Each distributor may be operatively connected to one of the plurality of inputs for receiving the respective input signal and be configured to select one or more corrective weights from the plurality of corrective weights in correlation with the input value.

The structure-forming module may be additionally configured to vary a number of the inputs, a number of the neurons, and a number of the synapses during the training of the neural network.

The structure-forming module may be additionally configured, during the training of the neural network, to reset a degree of connectivity between the inputs and the neurons, a number of the outputs, a number of the corrective weights on each respective synapse, and the weight values of the corrective weights.

The training module may be additionally configured to access a testing input signal having a value and access a desired testing output signal. The training module may be further configured to determine a difference between the testing input signal and the desired testing output signal value during the training to thereby evaluate effectiveness of ongoing training of the neural network.

The received input signals may include the testing input signal.

The training module may additionally be configured to select an input signal from the received input signals and alter the selected input signal. The training module may be further configured to communicate the altered selected input signal to the controller to compare the altered selected input signal with the desired testing output signal and thereby evaluate the effectiveness of the ongoing training A method of training a neural network having an operative structure is also disclosed. The method includes receiving training images via a plurality of inputs to the neural network, wherein the training images are either received as a training input value array or codified as the training input value array during training of the neural network. The method also includes organizing corrective weights of a plurality of synapses in a corrective weight array. According to the method, each synapse is connected to one of the plurality of inputs and includes a plurality of corrective weights, and each corrective weight is defined by a weight value. The method additionally includes generating a neuron sum array via a plurality of neurons. According to the method, each neuron has at least one output and is connected with at least one of the plurality of inputs via at least one of the plurality of synapses, and each neuron is configured to add up the weight values of the corrective weights corresponding to each synapse connected to the respective neuron.

The method additionally includes receiving, via a controller, desired images organized as a desired output value array and determining a deviation of the neuron sum array from the desired output value array and generate a deviation array. The method also includes modifying, via the controller, the corrective weight array using the determined deviation array. Such adding up the modified corrective weight values to determine the neuron sum array reduces the deviation of the neuron sum array from the desired output value array to generate a trained corrective weight array and thereby facilitate concurrent training of the neural network.

The method additionally includes selectively arranging and rearranging connections between neural network elements including the plurality of inputs, the plurality of synapses, and the plurality of neurons during the training of the neural network via a structure-forming module. The method also includes distributing the training images among the neural network elements via a signal allocation module during the training of the neural network. The method further includes commanding and coordinating operation of the controller, the structure-forming module, and the signal allocation module to reorganize the operative structure of the neural network during the training of the neural network via a training module, to thereby control, in real-time, the training of the neural network.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
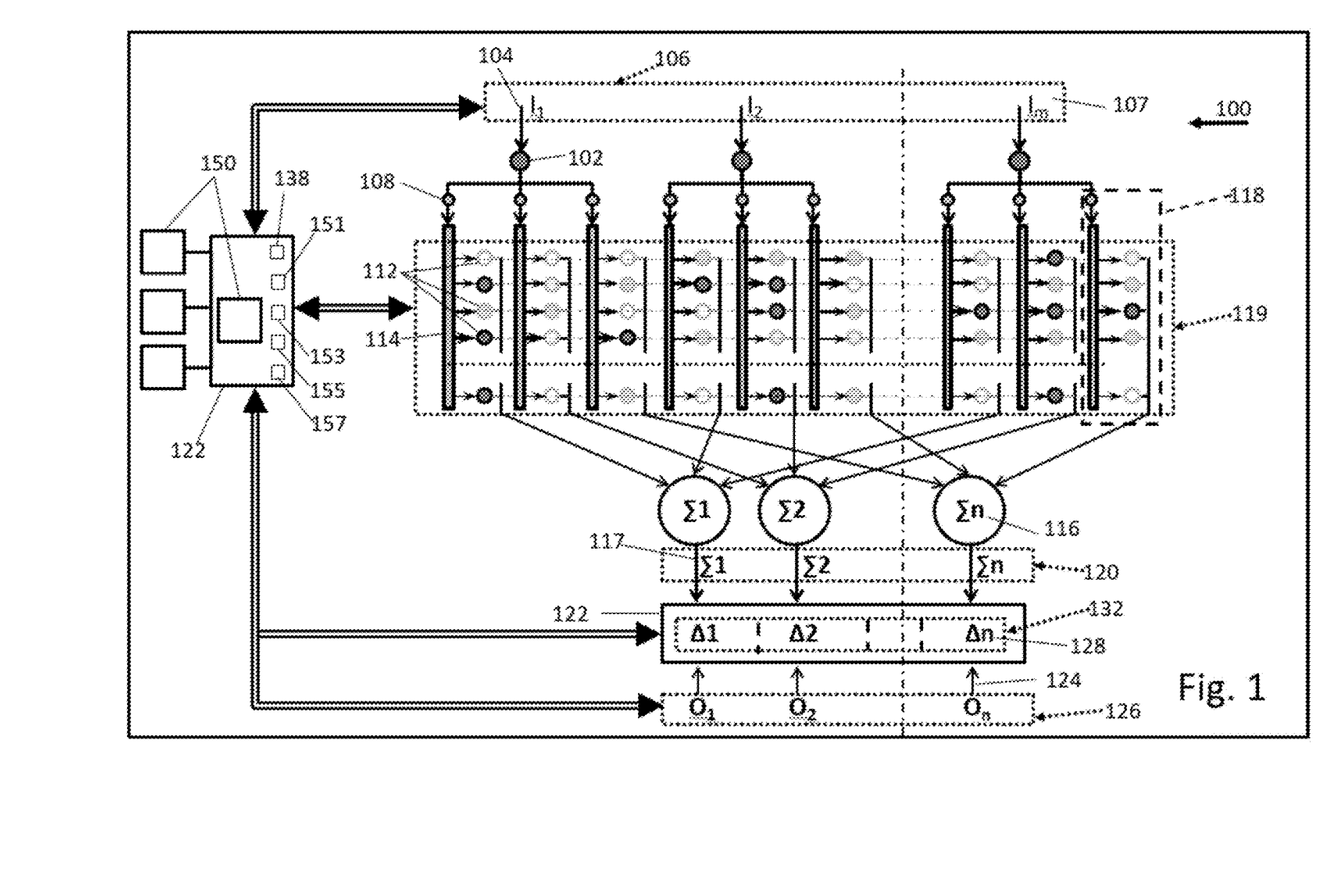
FIG. 1 is an illustration of a "progressive neural network" (p-net) having a plurality of synapses and a plurality of corrective weights associated with each synapse, according to the disclosure.

Referring to the drawings, wherein like reference numbers refer to like components, FIG. 1 shows a general schematic view of a progressive artificial neural network 100, thereafter "the network", or "p-net" 100. The p-net 100 may be implemented as software programmed into an apparatus, such as a computer or a system of computers, or be configured as a combination of software and hardware incorporated into a non-transitory computer-readable storage device, or a hardware device such as a microchip.

The p-net 100 includes a plurality of inputs 102, and is a means for executing the actions described in detail below. Each input 102 is configured to receive an input signal 104, wherein the input signals are represented as $I_1, I_2 \ldots I_m$ in FIGS. 1-3. Each input signal $I_1, I_2 \ldots I_m$ represents a value of some characteristic(s) of an input image 106, for example, a magnitude, frequency, phase, signal polarization angle, or association with different parts of the input image 106. The term "image" as employed herein is intended to denote any type of information or data received for processing or generated by the neural network. Each input signal 104 has an input value, wherein together the plurality of input signals 104 generally describes the input image 106. A trained p-net is designated via numeral 100A. When the p-net 100 is being trained, the input image 106 is defined as a training image, while in the trained p-net 100A the input image 106 is intended to undergo recognition.

Each input value may be within a value range that lies between $-\infty$ and $+\infty$ and may be set in digital and/or analog forms. The range of the input values may depend on a set of training images. In the simplest case, the range input values could be the difference between the smallest and largest values of input signals for all training images. For practical reasons, the range of the input values may be limited by eliminating input values that are deemed too high. For example, such limiting of the range of the input values may be accomplished via known statistical methods for variance reduction, such as importance sampling. Another example of limiting the range of the input values may be designation of all signals that are lower than a predetermined minimum level to a specific minimum value and designation of all signals exceeding a predetermined maximum level to a specific maximum value. The training images 106 are either received by the plurality of inputs 102 as a training input value array 107 or codified as a training input value array 107 during training of the p-net 100, i.e., after having been received by the plurality of inputs.

Figure 2:
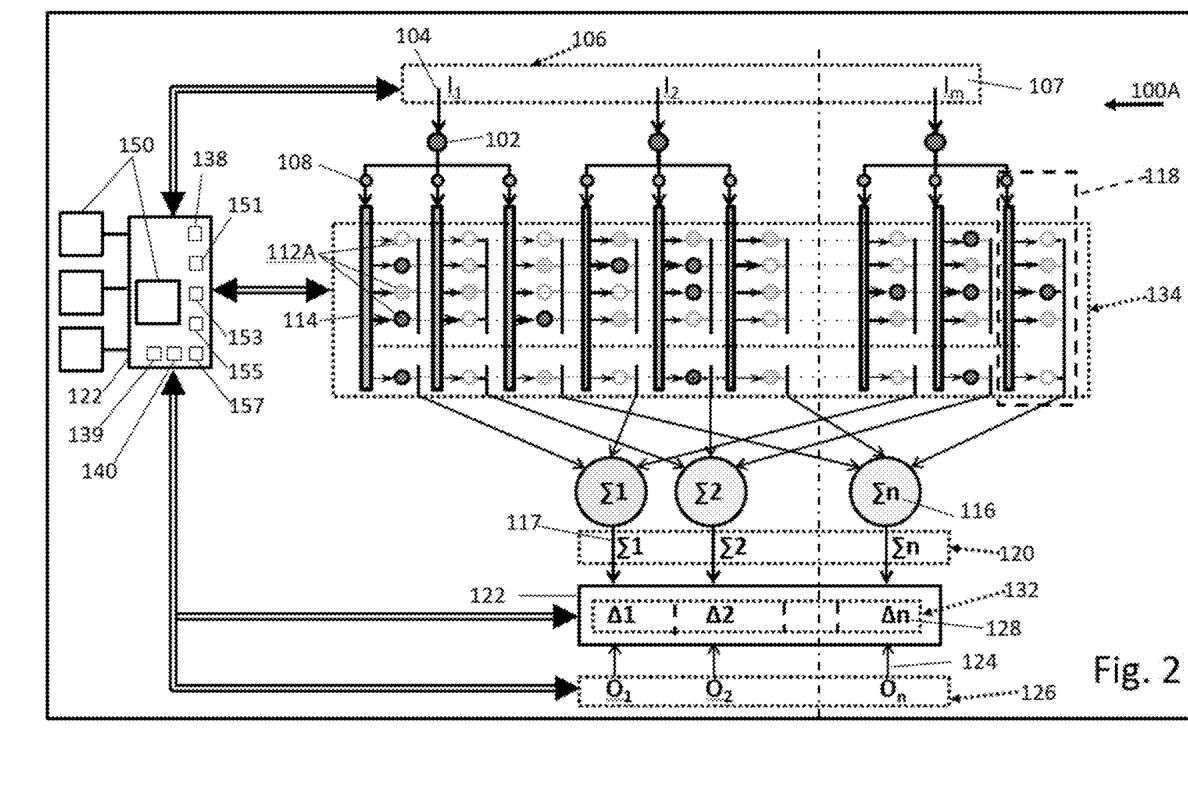
FIG. 2 is an illustration of the p-net in the process of being trained, according to the disclosure.
Figure 3:
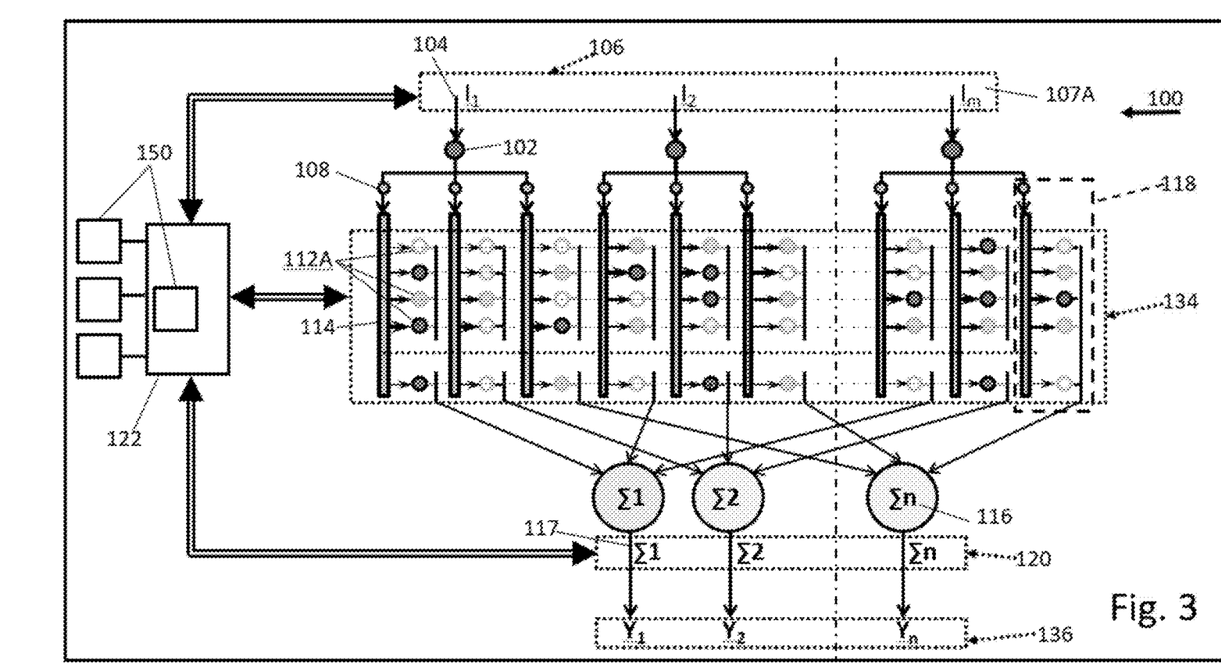
FIG. 3 is an illustration of the p-net in the process of image recognition, according to the disclosure.

The p-net 100 also includes a plurality or a set of synapses 118. Each synapse 118 is connected to one of the plurality of inputs 102, includes a plurality of corrective weights 112, and may also include a synaptic weight 108, as shown in FIGS. 1-3. Each corrective weight 112 is defined by a respective weight value. Additionally, the corrective weights 112 of all the synapses 118 are organized as, i.e., in the form of, a corrective weight array 119. Accordingly, in FIG. 1, the corrective weight array 119 includes all the corrective weights 112 within the dashed box 119. The p-net 100 may also include a set of distributors 114. In such an embodiment, each distributor 114 is operatively connected to one of the plurality of inputs 102 for receiving the respective input signal 104. Each synapse 118 is configured to communicate weight signals 113 indicative of the weight values of the respective corrective weights 112, and may communicate a signal indicative of the respective synaptic weight 108.

The p-net 100 additionally includes a set of neurons 116, and is a means for executing the actions described in detail below. Each neuron 116 has at least one output 117 and is connected with at least one of the plurality of inputs 102 via at least one synapse 118. Each neuron 116 is configured to receive the weight signals 113 indicative of the weight values of the respective corrective weights 112 from the at least one of the plurality of synapses 118. Each neuron 116 is additionally configured to add up or sum the corrective weight values of the corrective weights 112 selected from each synapse 118 connected to the respective neuron 116 and thereby generate and output a neuron sum array 120, otherwise designated as In. A separate distributor 114 may be used for each synapse 118 of a given input 102, as shown in FIGS. 1-3. Alternatively, a single distributor may be used for all such synapses (not shown). During formation or setup of the p-net 100, all corrective weights 112 are assigned initial values, which may change during the process of p-net training, shown in FIG. 2. The initial value of the corrective weight 112 may be selected randomly, calculated with the help of a pre-determined mathematical function, selected from a predetermined template, etc. Initial values of the corrective weights 112 may be either identical or distinct for each corrective weight 112, and may also be zero.

As shown in FIG. 2, the p-net 100 also includes a controller 122 configured to regulate training of the p-net 100, and as such is a means for executing the actions described in detail below. In order to appropriately perform the tasks described in detail below, the controller 122 includes a memory, at least some of which is tangible and non-transitory. The memory of the controller 122 may be a recordable medium that participates in providing computer-readable data or process instructions. Such a medium may take many forms, including but not limited to non-volatile media and volatile media. Non-volatile media for the controller 122 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer.

Memory of the controller 122 may also include an appropriate medium, for example a magnetic or an optical medium. The controller 122 may be configured or equipped with other required computer hardware, such as a high-speed clock, requisite Analog-to-Digital (A/D) and/or Digital-to-Analog (D/A) circuitry, necessary input/output circuitry and devices (I/O), as well as appropriate signal conditioning and/or buffer circuitry. Algorithms required by the controller 122 or accessible thereby may be stored in the memory and automatically executed to provide the required functionality described in detail below.

The controller 122 may be programmed to organize the corrective weights 112 into the corrective weight array 119. The controller 122 is also configured to receive desired images 124 organized as a desired output value array 126, determine a deviation 128 of the neuron sum array 120 from the desired output value array, and generate a deviation array 132. The controller 122 is further configured to modify the corrective weight array 119 using the determined deviation array 132. In such a case, adding up the modified corrective weight values to determine the neuron sum array 120 reduces, i.e., minimizes, the deviation 128 of the neuron sum array 120 from the desired output value array 126 to generate a trained corrective weight array 134. As shown in FIGS. 2-3, and analogous to the corrective weight array 119 shown in FIG. 1, the trained corrective weight array 134 includes all the corrective weights 112 within the dashed box 134. As shown in FIGS. 2-3, and analogous to FIG. 1, the corrective weight array 119 includes all the corrective weights 112 within the dashed box 119 and may include the distributors 114 associated therewith. Therefore, the minimized deviation 128 of the neuron sum array 120 compensates for errors generated by the p-net 100. Furthermore, the generated trained corrective weight array 134 facilitates concurrent or parallel training of the p-net 100.

In a trained p-net 100A, shown in FIG. 3, the plurality of inputs 102 to the p-net may be configured to receive input images 106. Such input images 106 may be either received as an input value array 107A or codified as an input value array 107A during recognition of the images by the p-net 100. Each synapse 118 may include a plurality of trained corrective weights 112A. Additionally, each neuron 116 may be configured to add up the weight values of the trained corrective weights 112A corresponding to each synapse 118 connected to the respective neuron, such that the plurality of neurons generate a recognized images array 136, thereby providing recognition of the input images 106. In the embodiment of the p-net 100 and the trained p-net 100A that includes the set of distributors 114, the distributors may be configured to codify the training and input images 106 as the respective training input value array 107 and input value array 107A. Accordingly, such a set of distributors 114 being operatively connected to the plurality of inputs 102 for receiving each of the respective training and input images 106. The above operations may be performed using structured matrices, specifically a trained corrective weight matrix in place of the trained corrective weight array 134, as will be described in detail below.

The controller 122 may additionally be programmed with an array of target deviation or target deviation array 138 of the neuron sum array 120 from the desired output value array 126. Furthermore, the controller 122 may be configured to complete training of the p-net 100 when the deviation 128 of the neuron sum array 120 from the desired output value array 126 is within an acceptable range 139 of the target deviation array 138. The acceptable range 139 may be referenced against a maximum or a minimum value in, or an average value of the target deviation array 138. Alternatively, the controller 122 may be configured to complete training of the p-net 100 when the speed of reduction of the deviation 128 or convergence of the training input value array 107 and the desired output value array 126 falls to a predetermined speed value 140. The acceptable range 139 and/or the predetermined speed value 140 may be programmed into the controller 122.

The training input value array 107, input value array 107A, the corrective weight array 119, neuron sum array 120, desired output value array 126, deviation array 132, trained corrective weight array 134, recognized images array 136, and target deviation array 138, i.e., parameter values therein, may be organized, respectively, as a training input value matrix 141, input value matrix 141A, corrective weight matrix 142, neuron sum matrix 143, desired output value matrix 144, deviation matrix 145, trained corrective weight matrix 146, recognized images matrix 147, and target deviation matrix 148. Wherein in each respective array 107, 107A, 119, 120, 126, 132, 134, 136, and 138, values of the respective parameters may be organized, for example, in the form of a processor accessible data table, the values in the respective matrices 141, 141A, 142, 143, 144, 145, 146, 147, and 148 are specifically organized to enable application of algebraic matrix operations to each respective matrix individually, as well as to combinations thereof. The matrices 141, 141A, 142, 143, 144, 145, 146, 147, and 148 are not specifically shown in the figures, but, when organized as such, are to be understood as taking place of the respective arrays 107, 107A, 119, 120, 126, 132, 134, 136, and 138.

In the examples below, for illustration purposes, particular matrices are depicted with arbitrary number of columns and rows. For example, the training images may be received and/or organized in an input training matrix

|  | Input 1 | Input 2 | Input 3 |
|---|---|---|---|
| Image 1 | $I_{11}$ | $I_{21}$ | $I_{31}$ |
| Image 2 | $I_{12}$ | $I_{22}$ | $I_{32}$ |
| Image 3 | $I_{13}$ | $I_{23}$ | $I_{33}$ |

Subsequently, the above training input images matrix may be converted via the controller 122 into the training input value matrix 141, which is represented as matrix |C|. Each matrix |C| will have a corresponding number of columns for the number of inputs "I", but accounting for a specific number of intervals "i", and a corresponding number of rows for the number of images.

|  | Input 1 |  |  |  | Input 2 |  |  |  | Input 3 |  |  |  |
|---|---|---|---|---|---|---|---|---|---|---|---|---|
|  | i1 | i2 | i3 | i4 | i1 | i2 | i3 | i4 | i1 | i2 | i3 | i4 |
| Image 1 | $C_{111}$ | $C_{121}$ | $C_{131}$ | $C_{141}$ | $C_{211}$ | $C_{221}$ | $C_{231}$ | $C_{241}$ | $C_{311}$ | $C_{321}$ | $C_{331}$ | $C_{341}$ |
| Image 2 | $C_{112}$ | $C_{122}$ | $C_{132}$ | $C_{142}$ | $C_{212}$ | $C_{222}$ | $C_{232}$ | $C_{242}$ | $C_{312}$ | $C_{322}$ | $C_{332}$ | $C_{342}$ |
| Image 3 | $C_{113}$ | $C_{123}$ | $C_{133}$ | $C_{143}$ | $C_{213}$ | $C_{223}$ | $C_{233}$ | $C_{243}$ | $C_{313}$ | $C_{323}$ | $C_{333}$ | $C_{343}$ |

In matrix |C|, intervals "i" identified with a specific corrective weight 112 that will be used during training. In columns corresponding to intervals "i", the values of signals may be replaced with ones (1) to signify that the particular signal will be used in the particular interval, while in other intervals for the subject signal, the values of signals may be replaced with zeros (0) to signify that the particular interval will not be considered.

An exemplary corrective weight matrix 146 may be formed as matrix |W| shown below:

|  | Intervals | Output 1 | Output 2 | Output 3 |
|---|---|---|---|---|
| Input 1 | i1 | $W_{111}$ | $W_{112}$ | $W_{113}$ |
|  | i2 | $W_{121}$ | $W_{122}$ | $W_{123}$ |
|  | i3 | $W_{131}$ | $W_{132}$ | $W_{133}$ |
|  | i4 | $W_{141}$ | $W_{142}$ | $W_{143}$ |
| Input 2 | i1 | $W_{211}$ | $W_{212}$ | $W_{213}$ |
|  | i2 | $W_{221}$ | $W_{222}$ | $W_{223}$ |
|  | i3 | $W_{231}$ | $W_{232}$ | $W_{233}$ |
|  | i4 | $W_{241}$ | $W_{242}$ | $W_{243}$ |
| Input 3 | i1 | $W_{311}$ | $W_{312}$ | $W_{313}$ |
|  | i2 | $W_{321}$ | $W_{322}$ | $W_{323}$ |
|  | i3 | $W_{331}$ | $W_{332}$ | $W_{333}$ |
|  | i4 | $W_{341}$ | $W_{342}$ | $W_{343}$ |

The neuron sum matrix 143 may be represented as matrix $|\Sigma|$ shown below:

$$|\Sigma| = |C| \times |W| = \begin{matrix} \Sigma_{11} & \Sigma_{12} & \Sigma_{13} \\ \Sigma_{21} & \Sigma_{22} & \Sigma_{23} \\ \Sigma_{31} & \Sigma_{32} & \Sigma_{33} \end{matrix} ==$$

$$\Sigma_{11} = C_{111} \times W_{111} + C_{121} \times W_{121} + C_{131} \times W_{131} \ldots$$
$$\Sigma_{21} = C_{211} \times W_{211} + C_{221} \times W_{221} + C_{231} \times W_{231} \ldots$$
$$\Sigma_{31} = C_{311} \times W_{311} + C_{321} \times W_{321} + C_{331} \times W_{331} \ldots$$
$$\Sigma_{12} = C_{112} \times W_{113} + C_{122} \times W_{122} + C_{132} \times W_{132} \ldots$$
$$\Sigma_{22} = C_{212} \times W_{212} + C_{222} \times W_{222} + C_{232} \times W_{232} \ldots$$

The desired output value matrix 144 may be formed as matrix |O|, as shown below:

|  | Output 1 | Output 2 | Output 3 |
|---|---|---|---|
| Image 1 | $O_{11}$ | $O_{12}$ | $O_{13}$ |
| Image 2 | $O_{21}$ | $O_{22}$ | $O_{23}$ |
| Image 3 | $O_{31}$ | $O_{32}$ | $O_{33}$ |

The deviation 128 of the neuron sum matrix 143 may be determined from the desired output value matrix 144 to generate the deviation matrix 148 represented as matrix |E| below:

$$|E| = |O| - |\Sigma| = \begin{matrix} \Sigma_{11} & \Sigma_{12} & \Sigma_{13} \\ \Sigma_{21} & \Sigma_{22} & \Sigma_{23} \\ \Sigma_{31} & \Sigma_{32} & \Sigma_{33} \end{matrix}$$

Wherein, $\Sigma_{11} = O_{11} - \Sigma_{11}$ $\Sigma_{21} = O_{21} - \Sigma_{21}$ $\Sigma_{12} = O_{12} - \Sigma_{12}$ etc.

The corrective weight matrix 142, represented as matrix |W| below, may be modified using the determined deviation matrix 145, which permits adding up the modified corrective weight 112 values to determine the neuron sum matrix 143 to minimize the deviation of the neuron sum matrix 143 from the desired output value matrix 144 to generate a trained corrective weight matrix 146, represented as matrix $|W_{trained}|$. The matrix $|W_{trained}|$ is derived according to expression $|W_{trained}| = |W| + |\nabla W|$ (wherein the factor $|\nabla W|$ will be described in detail below):

| | Intervals | Output 1 | Output 2 | Output 3 |
|---|---|---|---|---|
| Input 1 | i1 | $W_{111} + VW_{111}$ | $W_{112} + VW_{112}$ | $W_{113} + VW_{113}$ |
| | i2 | $W_{121} + VW_{121}$ | $W_{122} + VW_{122}$ | $W_{123} + VW_{123}$ |
| | i3 | $W_{131} + VW_{131}$ | $W_{132} + VW_{132}$ | $W_{133} + VW_{133}$ |
| | i4 | $W_{141} + VW_{141}$ | $W_{142} + VW_{142}$ | $W_{143} + VW_{143}$ |
| Input 2 | i1 | $W_{211} + VW_{211}$ | $W_{212} + VW_{212}$ | $W_{213} + VW_{213}$ |
| | i2 | $W_{221} + VW_{221}$ | $W_{222} + VW_{222}$ | $W_{223} + VW_{223}$ |
| | i3 | $W_{231} + VW_{231}$ | $W_{232} + VW_{232}$ | $W_{233} + VW_{233}$ |
| | i4 | $W_{241} + VW_{241}$ | $W_{242} + VW_{242}$ | $W_{243} + VW_{243}$ |
| Input 3 | i1 | $W_{311} + VW_{311}$ | $W_{312} + VW_{312}$ | $W_{313} + VW_{313}$ |
| | i2 | $W_{321} + VW_{321}$ | $W_{322} + VW_{322}$ | $W_{323} + VW_{323}$ |
| | i3 | $W_{331} + VW_{331}$ | $W_{332} + VW_{332}$ | $W_{333} + VW_{333}$ |
| | i4 | $W_{341} + VW_{341}$ | $W_{342} + VW_{342}$ | $W_{343} + VW_{343}$ |

As discussed above, the formation of the trained corrective weight array 134 and the trained corrective weight matrix 146 facilitates concurrent training of the p-net 100.

In the embodiment of image recognition (shown in FIG. 3) using the trained p-net 100A, concurrent recognition of a batch of input images 106 may be provided using matrix operation described above. Specifically, the trained p-net 100A the corrective weights array, which may be represented as a two-dimensional n×k matrix |W|, where "n" is the number of neurons 116 and "k" is the number of corrective weights 112 in a particular neuron. The matrix |W| may be generally represented as follows:

| $W_{11}$ | $W_{12}$ | $W_{13}$ | ... | $W_{1k}$ |
|---|---|---|---|---|
| $W_{21}$ | $W_{22}$ | $W_{23}$ | ... | $W_{2k}$ |
| $W_{31}$ | $W_{32}$ | $W_{33}$ | ... | $W_{3k}$ |
| $W_{41}$ | $W_{42}$ | $W_{43}$ | ... | $W_{4k}$ |
| ... | ... | ... | ... | ... |
| $W_{n1}$ | $W_{n2}$ | $W_{n3}$ | ... | $W_{nk}$ |

For concurrent recognition of a batch of input images 106, the input images to be recognized may be presented as a v×k matrix |Ir|, where "v" is the number of recognizable images, "k" is the number of corrective weights 112 in a particular neuron 116. The matrix |Ir| of input images 106 for recognition may be generally represented as follows:

| $Ir_{11}$ | $Ir_{21}$ | $Ir_{31}$ | ... | $Ir_{v1}$ |
|---|---|---|---|---|
| $Ir_{12}$ | $Ir_{22}$ | $Ir_{32}$ | ... | $Ir_{v2}$ |
| $Ir_{13}$ | $Ir_{23}$ | $Ir_{33}$ | ... | $Ir_{v3}$ |
| $Ir_{14}$ | $Ir_{24}$ | $Ir_{34}$ | ... | $Ir_{v4}$ |
| ... | ... | ... | ... | ... |
| $Ir_{1k}$ | $Ir_{2k}$ | $Ir_{3k}$ | ... | $Ir_{vk}$ |

In the above matrix |Ir|, each row of the matrix is a single image subjected to recognition.

Concurrent recognition of a batch of input images 106 may be provided by multiplication of the matrix |W| by a transposed matrix $|I|^T$, to generate the recognized image matrix 147, represented by a symbol "|Y|", and represented as follows:

$$|Y| = |W| \times |Ir|^T$$

The matrix |Y| has dimensions n×v. Each column of the matrix |Y| is a single output or recognized image obtained by the trained p-net 100A. The matrix |Y| may be generally depicted as follows:

| $Y_{11}$ | $Y_{12}$ | $Y_{13}$ | ... | $Y_{1v}$ |
|---|---|---|---|---|
| $Y_{21}$ | $Y_{22}$ | $Y_{23}$ | ... | $Y_{2v}$ |
| $Y_{31}$ | $Y_{32}$ | $Y_{33}$ | ... | $Y_{3v}$ |
| $Y_{41}$ | $Y_{42}$ | $Y_{43}$ | ... | $Y_{4v}$ |
| ... | ... | ... | ... | ... |
| $Y_{n1}$ | $Y_{n2}$ | $Y_{n3}$ | ... | $Y_{nv}$ |

Each of the p-net 100 and 100A may additionally include a data processor 150, which may be a sub-unit of the controller 122. In such embodiments, the controller 122 may be additionally configured to partition or cut-up at least one of the respective training input value matrix 141, input value matrix 141A, corrective weight matrix 142, neuron sum matrix 143, and desired output value matrix 144 into respective sub-matrices. The controller 122 may also be configured to communicate a plurality of the resultant sub-matrix or sub-matrices to the data processor 150 for separate mathematical operations therewith. Such partitioning of any of the subject matrices 141, 142, 143, and 144 into respective sub-matrices facilitates concurrent or parallel data processing and an increase in speed of either image recognition of the input value matrix 141A or training of the p-net 100. Such concurrent or parallel data processing also permits scalability of the p-net 100 or 100A, i.e., provides ability to vary the size of the p-net by limiting the size of the respective matrices being subjected to algebraic manipulations on a particular processor and/or breaking up the matrices between multiple processors, such as the illustrated processor 150. As shown in FIGS. 1-3, in such an embodiment of the p-net 100 and 100A, multiple data processors 150 in communication with the controller 122 may be employed, whether as part of the controller 122 or arranged distally therefrom, and configured to operate separately and in parallel.

The controller 122 may modify the corrective weight matrix 142 by applying an algebraic matrix operation to the training input value matrix 141A and the corrective weight matrix to thereby train the p-net 100. Such a mathematical matrix operation may include a determination of a mathematical product of the input value matrix 141A and the corrective weight matrix 146 to thereby form a current training epoch weight matrix 151. The controller 122 may also be configured to subtract the neuron sum matrix 143 from the desired output value matrix 144 to generate a matrix of deviation of neuron sums 153 depicted as matrix |E| described above. Additionally, the controller 122 may be configured to divide the matrix of deviation of neuron sums 153 by the number of synapses 118, identified below with a letter "m", connected to the respective neuron 116 to generate a matrix of deviation per neuron input 155, represented below by the symbol "|ΔW|", as follows:

$$|\Delta W| = |E|/m$$

The controller 122 may be additionally configured to determine a number of times each corrective weight 112 was used during one training epoch of the p-net 100 represented in the expression below by the symbol "|S|". As shown below, the matrix |S| is obtained via multiplication of the training input value matrix 141A by a unit vector:

$$|S| = \begin{matrix} C11 & C12 & C13 \\ C21 & C22 & C23 \\ C31 & C32 & C33 \end{matrix} \times \begin{matrix} 1 \\ 1 \\ 1 \end{matrix}$$

The controller 122 may be further configured to form an averaged deviation matrix 157, represented below by the symbol "|VW|", for the one training epoch using the determined number of times each corrective weight was used during the one training epoch.

$$|\nabla W| = |\Delta W|/|S|$$

Furthermore, the controller 122 may be configured to add the averaged deviation matrix 157 for the one training epoch to the corrective weight matrix 142 to thereby generate the trained corrective weight matrix 146, represented below as $|W_{trained}|$, and complete the one training epoch as shown below:

$$|W_{trained}| = |W| + |\nabla W|$$

|  | Intervals | Output 1 | Output 2 | Output 3 |
|---|---|---|---|---|
| Input 1 | i1 | $W_{111} + \nabla W_{111}$ | $W_{112} + \nabla W_{112}$ | $W_{113} + \nabla W_{113}$ |
|  | i2 | $W_{121} + \nabla W_{121}$ | $W_{122} + \nabla W_{122}$ | $W_{123} + \nabla W_{123}$ |
|  | i3 | $W_{131} + \nabla W_{131}$ | $W_{132} + \nabla W_{132}$ | $W_{133} + \nabla W_{133}$ |
|  | i4 | $W_{141} + \nabla W_{141}$ | $W_{142} + \nabla W_{142}$ | $W_{143} + \nabla W_{143}$ |
| Input 2 | i1 | $W_{211} + \nabla W_{211}$ | $W_{212} + \nabla W_{212}$ | $W_{213} + \nabla W_{213}$ |
|  | i2 | $W_{221} + \nabla W_{221}$ | $W_{222} + \nabla W_{222}$ | $W_{223} + \nabla W_{223}$ |
|  | i3 | $W_{231} + \nabla W_{231}$ | $W_{232} + \nabla W_{232}$ | $W_{233} + \nabla W_{233}$ |
|  | i4 | $W_{241} + \nabla W_{241}$ | $W_{242} + \nabla W_{242}$ | $W_{243} + \nabla W_{243}$ |
| Input 3 | i1 | $W_{311} + \nabla W_{311}$ | $W_{312} + \nabla W_{312}$ | $W_{313} + \nabla W_{313}$ |
|  | i2 | $W_{321} + \nabla W_{321}$ | $W_{322} + \nabla W_{322}$ | $W_{323} + \nabla W_{323}$ |
|  | i3 | $W_{331} + \nabla W_{331}$ | $W_{332} + \nabla W_{332}$ | $W_{333} + \nabla W_{333}$ |
|  | i4 | $W_{341} + \nabla W_{341}$ | $W_{342} + \nabla W_{342}$ | $W_{343} + \nabla W_{343}$ |

In general, a neural network model is required to learn from known examples and generalize from those known examples to new examples in the future. At times, while handling complex training tasks, neural networks may face issues that inhibit the training process and depress precision of training results. One such issue is "linear separability". In Euclidean geometry, linear separability is a property of a number of distinct sets of points. Conceptually, these distinct sets are linearly separable if there exists at least one line in a reference plane with all of the points of one set on one side of the line and all the points of the other set on the other side. In machine learning, determination of whether such distinct sets, which may be descriptive of different image characteristics, are linearly separable, and finding a separating hyperplane if they are, is based on this concept. For effective training of a neural network, resolving linear separability frequently requires sorting and classifying of training data prior to commencement of the training, frequently requiring sophisticated algorithms to address the issue.

Another issue that may hamper the training of a neural network is the "exclusive or" or exclusive disjunction, otherwise known as the "XOR" problem. XOR gains the name "exclusive or" because the meaning of "or" is ambiguous when both operands are true; the exclusive "or" operator excludes that case. The concept may be defined as "one or the other but not both", and may be written as "A or B, but not, A and B". Generally, XOR is a logical operation that outputs true only when two inputs differ —one is true, the other is false. The negation of XOR is a logical biconditional, which outputs true only when both inputs are the same. The XOR problems are generally not linearly separable, and thus difficult to solve using traditional neural networks, and in some situations may require multiple networks to deal with effectively.

"Overfitting" is another issue that may reduce efficiency of training a neural network. Typically, overfitting of a neural network generates random error or noise instead of identifying an underlying relationship between data points in a particular dataset. Overfitting occurs when a neural network model is excessively complex, such as having too many parameters relative to the number of observations or training inputs. In general, a neural network model with too little capacity cannot learn the problem, whereas a model with too much capacity can learn it too well and overfit the training dataset. In other words, too little learning and the neural network model will perform poorly on the training dataset and on new data. Such a model will underfit the problem. Underfitting may generally be addressed by increasing capacity of the model. i.e., ability of a model to fit a variety of functions for mapping inputs to outputs. In traditional neural networks, increasing the capacity of a model is typically achieved by changing the structure of the model, such as adding more layers and/or more nodes to layers.

On the other hand, too much learning and the neural network model will perform well on the training dataset, but poorly on new data. Such a model will overfit the problem. Like in the underfit case, an overfit model does not generalize well and encounters difficulties during image and pattern recognition. An overfit model is generally diagnosed by monitoring the performance of the model during training via evaluating the performance on both a training dataset and on a holdout or validation dataset. Graphing of learning curves representing performance of a model overfit during training typically show a specific pattern—a line for the training dataset that drops and may plateau, and a line for the validation dataset that drops at first, and then at some point again begins to rise.

Figure 4:
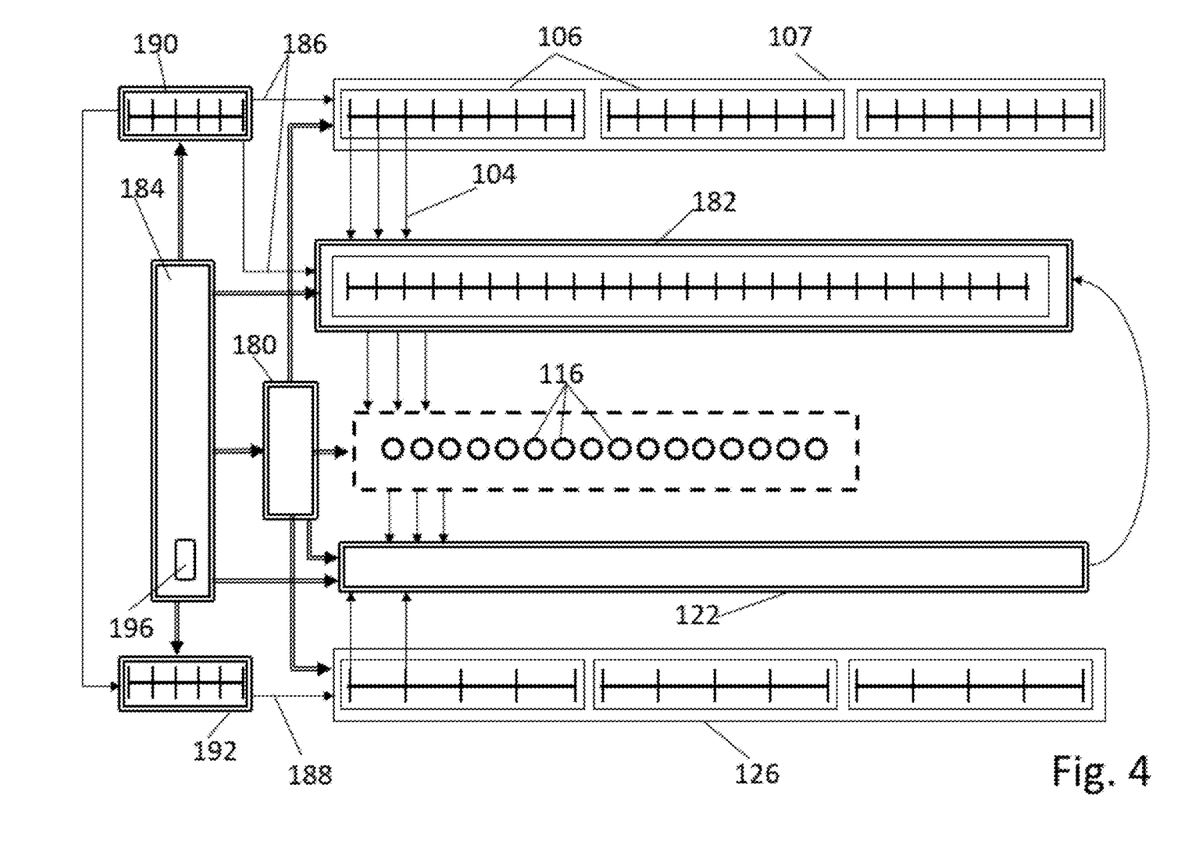
FIG. 4 an illustration of the p-net having a set of modules configured to modify operative structure of the p-net during ongoing p-net training, according to the disclosure.

Disclosed below is a set of modules configured to modify operative structure of the p-net 100 during training, in real-time, to enhance effectiveness of the training of the p-net and thereby address the above concerns of linear separability, XOR, overfitting, as well as other problems that may be encountered in neural networks. To such an end, the p-net 100 includes a structure-forming module. The structure-forming module 180 is configured to selectively arrange and rearrange connections between elements of the p-net 100 during the p-net training. The subject p-net 100 elements include the plurality of inputs 102, the set of neurons 116 and the plurality of synapses 118. The subject p-net 100 elements may also include the training input value array 107, the neuron outputs 117, the controller 122, and desired output value array 126. The structure-forming module 180 may be additionally configured to vary a number of the inputs 102, a number of the neurons 116, and a number of the synapses 118 during the training of the p-net 100.

Either following the change to the number of the inputs 102, the number of the neurons 116, and the number of the synapses 118, or in other instances during the p-net 100 training, the structure-forming module 180 may reset a number of additional parameters of the p-net 100 with the goal of enhancing the on-going training. For example, during the training of the p-net 100, the structure-forming module 180 may reset a degree of connectivity between the inputs 102 and the neurons 116. Within the context of the present disclosure, the expression "degree of connectivity" with respect to inputs and neurons indicates whether connections between some inputs 102 and some neurons 116 have an operative or active state or status, a restricted state, or an inactive state. Accordingly, during the training of the p-net 100, the structure-forming module 180 may selectively activate and deactivate operative connection(s) between particular input(s) 102 and neuron(s) 116. Additionally, during the training of the p-net 100, the structure-forming module 180 may activate a connection between a specific input 102 and a neuron 116 through a "pass coefficient", or connectivity filter, thereby restricting the contribution or weight of the subject neuron within the on-going training of the p-net 100.

Also, during the training of the p-net 100, the structure-forming module 180 may reset a number of the neuron outputs 117. During the training of the p-net 100, the structure-forming module 180 may also reset a number of the corrective weights 112 on each respective synapse 118. Additionally, during the training of the p-net 100, the structure-forming module 180 may reset the weight values of the corrective weights 112. Furthermore, during the training of the p-net 100, the structure-forming module 180 may reset input indexes, interval indexes, neuron indexes, and change access indexes correspondingly with the above changes in p-net structure.

The p-net 100 additionally includes a signal allocation module 182. The signal allocation module 182 is configured to distribute, for example assign, allocate and reallocate, and selectively direct and redirect, the input signals 104, i.e., the signals describing the training images 106, among elements of the p-net 100 during the p-net training. The signal allocation module 182 may be further configured to select one or more corrective weights 112 from the plurality of corrective weights, such as from the corrective weight array 119, in correlation with the respective input 102 signal values. The signal allocation module 182 may be configured to codify the training images 106 as the training input value array 107. The p-net 100 further includes a training module 184 in operative communication with the controller, the structure-forming module, and the signal allocation module. The training module 184 is configured to command and coordinate operation of the controller 122, the structure-forming module 180, and the signal allocation module 182 to reorganize the operative structure of the p-net 100 during the p-net training. Such reorganization of the operative structure of the p-net 100, via the training module 184, during the p-net training, thereby controls, in real-time, the training of the p-net, and ultimately generates the trained p-net 100A.

The training module 184 may be additionally configured to access dedicated testing input signals 186, each having a value. The testing input signals 186 may for example be testing training images. The received input signals 104, which together generally describe respective input images 106 may include the testing input signals 186. The training module 184 may be additionally configured to access desired testing output signals 188, each having a value. The desired testing output signals 188 may for example be desired testing output images. Consistent with the structure of the p-net 100 employing arrays and matrices, the training module 184 may be correspondingly configured to access an array 190 of dedicated testing images, which may be organized as a dedicated testing images matrix analogous to other matrices described elsewhere in the present disclosure. Similarly, the training module 184 may be configured to access an array 192 of desired testing output signals, which may be organized as a dedicated testing desired testing output images matrix.

Additionally, the training module 184 may be configured to input the accessed testing input signals 186, or the accessed array 190 or matrix of testing images, and the desired testing output signals 188, or the accessed array 192 or matrix of desired testing output images into the p-net 100, during the training of p-net 100. The training module 184 may be further configured to determine a difference 194 between the values of testing input signals 186 and the values of desired testing output signals 188 during the training. Determination of the difference 194 the values of signals 186 and 188 is intended to evaluate the success of the recognition and identification of the desired testing output images. In turn, the appraisal of success of recognition and identification of the desired testing output images facilitates an evaluation of effectiveness or quality of the ongoing training of the p-net 100. In other words, if the testing image recognition is deemed acceptable, i.e., within predetermined parameters, which may be preset within the training module 184, the recognition of the training images 106 will be deemed acceptable as well, and the training may be permitted to proceed. If, on the other hand, the effectiveness of testing image recognition is deemed unacceptable, the training module 184 may instruct the structure-forming module 180 to reset appropriate parameters of the p-net 100 and the signal allocation module 182 to distribute and selectively direct and redirect the input signals 104, thus facilitating another iteration of testing. Thus, the effectiveness of testing image recognition may trigger a feedback loop via the evaluated effectiveness of the ongoing training of the p-net 100.

The training module 184 may be further configured to select one or more input signals from the received input signals 104 and alter the selected input signal to be used specifically for testing the effectiveness of the training of the p-net 100. The altered selected input signal(s), herein specifically identified via numeral 196, may be indicative of a purposefully corrupted image. The training module 184 may be further configured to communicate the altered input signal(s) 196 to the controller 122. The controller 122 may then compare the altered input signal(s) 196 with the desired testing output signal(s) 188. Accordingly, such a corrupted image 196 may be used for comparison with the desired testing output image 188 to facilitate evaluation of resultant identification of the desired testing output image and the effectiveness of the ongoing training of the p-net 100. The altered input signal(s) 196 may be triggered in a feedback loop during the ongoing training of the p-net 100.

Figure 5:
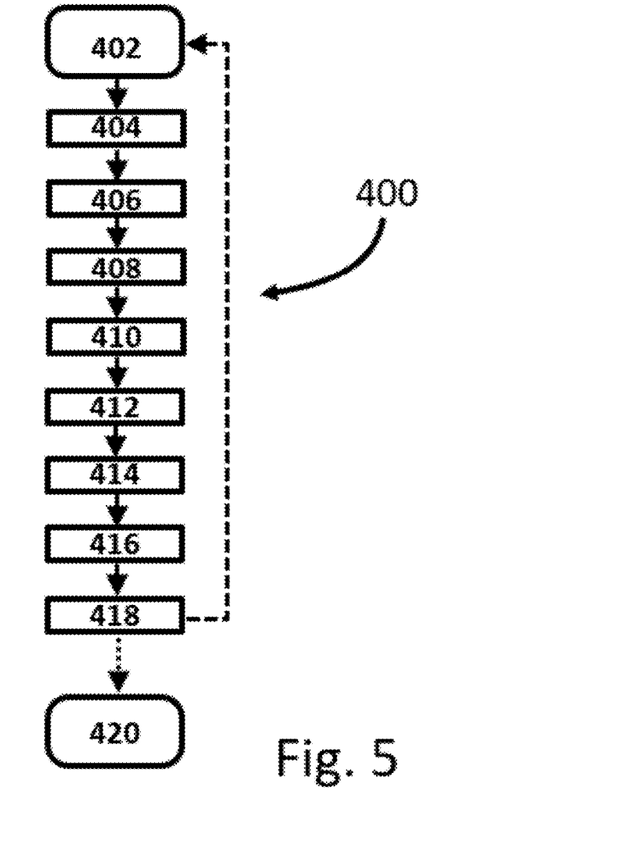
FIG. 5 is a flow diagram of a method for operating the neural network shown in FIGS. 1-4.

FIG. 5 depicts a method 400 of training the p-net 100 having the operative structure described above with respect to FIGS. 1-4, including the structure-forming module 180, the signal allocation module 182, and the training module 184. The method 400 is configured to enhance training of the p-net 100 when operated on an apparatus, such as a computer, or a system of computers employed in implementing supervised training using one or more data processors, such as the processor 150. The method 400 may be programmed into a non-transitory computer-readable storage device for operating the p-net 100 and encoded with instructions executable to perform the method.

The method 400 commences in frame 402 where the method includes receiving, via the plurality of inputs 102, the training images 106. As described above with respect to structure of the p-net 100 depicted in FIG. 1, the training images 106 may either be received as the training input value array 107 prior to commencement of the subject training phase or codified as the training input value array during the actual training phase. Following frame 402, the method advances to frame 404. In frame 404, the method includes organizing the corrective weights 112 of the plurality of synapses 118 in the corrective weight array 119. As described above with respect to the structure of the p-net 100, each synapse 118 is connected to one of the plurality of inputs 102 and includes a plurality of corrective weights 112.

After frame 404, the method proceeds to frame 406, in which the method includes generating the neuron sum array 120 via the plurality of neurons 116. As described above with respect to the structure of the p-net 100, each neuron 116 has at least one output 117 and is connected with at least one of the plurality of inputs 102 via at least one of the plurality of synapses 118. Furthermore, each neuron 116 is configured to add up the weight values of the corrective weights 112 corresponding to each synapse 118 connected to the respective neuron. Following frame 406, in frame 408, the method includes receiving, via the controller 122, desired images 124 organized as the desired output value array 126. After frame 408, the method proceeds to frame 410, in which the method includes determining, via the controller 122, the deviation 128 of the neuron sum array 120 from the desired output value array 126 and thereby generate the deviation array 132.

Following frame 410, the method advances to frame 412. In frame 412, the method includes modifying, via the controller 122, the corrective weight array 119 using the determined deviation array 132. The modified corrective weight values of the modified corrective weight array 119 may subsequently be added or summed up and then used to determine a new neuron sum array 120. The summed modified corrective weight values of the modified corrective weight array 119 may then serve to reduce or minimize the deviation of the neuron sum array 120 from the desired output value array 126 and generate the trained corrective weight array 134. The deviation array 132 may be determined as sufficiently minimized when the deviation 128 of the neuron sum array 120 from the desired output value array 126 is within the acceptable range 139 of the array of target deviation 138, as described above with respect to the structure of the p-net 100A. The trained corrective weight array 134 includes the trained corrective weights 112A determined using the deviation array 132 and thereby trains the p-net 100.

As described above with respect to the structure of the p-net 100, each of the training input value array 107, the corrective weight array 119, neuron sum array 120, desired output value array 126, deviation array 132, trained corrective weight array 134, and target deviation array 138 may be organized, respectively, as the training input value matrix 141, corrective weight matrix 142, neuron sum matrix 143, desired output value matrix 144, deviation matrix 145, trained corrective weight matrix 146, and target deviation matrix 148.

After frame 412, the method advances to frame 414. In frame 414, the method includes selectively arranging and rearranging connections between neural network elements, including the plurality of inputs 102, the plurality of neurons 116, and the plurality of synapses 118, during the training of the p-net 100 via the structure-forming module 180. In frame 414, the method may also include varying the number of the inputs 102, the number of the neurons 116, and the number of the synapses 118, via the structure-forming module 180, during the training of the p-net 100. Additionally, during the training of the p-net 100, in frame 414, the method may include resetting via the structure-forming module 180 the degree of connectivity between the inputs 102 and the neurons 116, the number of the neuron outputs 117, the number of the corrective weights 112 on each respective synapse 118; and the weight values of the corrective weights 112.

Following frame 414, the method advances to frame 416. In frame 416, the method includes distributing, such as selectively directing and redirecting, as well as allocating and reallocating, the training images 106 among the p-net 100 elements via the signal allocation module 182 during the training of the p-net. In frame 416, the method may also include accessing, via the training module 182, the array of dedicated testing input images 190 or matrix of dedicated testing input images having respective testing input values. In frame 416, the method may also include accessing, via the training module 182, the array 192 or matrix of desired testing output images having respective desired testing output values. In frame 416, the method may additionally include inputting, via the training module 182, the accessed array 190, or matrix of testing input images and the accessed array 192, or matrix of desired testing output images into the p-net 100 during the training of the p-net. Furthermore, in frame 416, the method may include determining, via the training module 182, the difference 194 between the testing input images 186 in the respective array 190 or matrix, and the desired testing output images 188 in the respective array 192 or matrix during the training of the p-net 100 to thereby evaluate effectiveness of the ongoing training.

Moreover, in frame 416, the method may include selecting, via the training module 182, the training image(s) 104 from the training input value array 107. Also, in frame 416, the method may include altering the selected training image(s) 104 to generate the altered selected training image 196. As described above with respect to FIGS. 1-4, the altered selected input image(s) 196 may be indicative of purposefully corrupted image(s). And then, in frame 416, the method may include communicating thus altered selected training image(s) 196 to the controller 122 for comparing the altered input image(s) 196 with the desired testing output image(s) 188. Accordingly, such corrupted image(s) 196 may be used for comparison with the desired testing output image(s) 188 to facilitate evaluation of resultant identification of the desired testing output image(s) and the corresponding effectiveness of the ongoing training of the p-net 100.

The training module 184 may be further configured to select one or more input signals from the received input signals 104 and alter the selected input signal to be used specifically for testing the effectiveness of the training of the p-net 100. The altered selected input signal(s), herein specifically identified via numeral 196, may be indicative of a purposefully corrupted image. The training module 184 may be further configured to communicate the altered input signal(s) 196 to the controller 122. The controller 122 may then compare the altered input signal(s) 196 with the desired testing output signal(s) 188. Accordingly, such a corrupted image 196 may be used for comparison with the desired testing output image 188, to facilitate evaluation of resultant identification of the desired testing output image 188 and the effectiveness of the ongoing training of the p-net 100. The altered input signal(s) 196 may be employed in a feedback loop during the ongoing training of the p-net 100.

After frame 416, the method proceeds to frame 418, in which the method includes commanding and coordinating operation of the controller 122, the structure-forming module 180, and the signal allocation module 182 to reorganize the operative structure of the p-net 100 during the training of the p-net via the training module 184. As described above with respect to FIGS. 1-4, reorganizing the operative structure of the p-net 100 is thereby intended to control, in real-time, the training of the p-net 100 and enhance the effectiveness of the ongoing training of the p-net 100. Following frame 418 the method 400 may return to frame 402 for additional enhanced training of the p-net 100 via the structure-forming module 180, the signal allocation module 182, and the training module 184, if the achieved image recognition is deemed insufficiently precise, or the method may conclude in frame 420.

A "division by zero" situation may be encountered in coding of data and specifically with respect to programming of neural networks. There are various known solutions to deal with such a contingency. For example, in programming, division by zero may be resolved by using the function "NULLIF" which compares two expressions and returns null rather than zero, if the two expression are equal, or otherwise returns the first expression.

Overall, the reorganizing of the operative structure of the p-net 100 via the training module 184 during the ongoing training of the p-net through cooperation between the controller 122, the structure-forming module 180, and the signal allocation module 182 is intended to address, in real-time, effectiveness of the training which may be impacted by various data characteristics, data organization, coding, and computation issues, including the previously noted linear separability, XOR, and overfitting. As described above, such reorganizing of the p-net 100 operative structure may be based on continuous evaluation of the effectiveness of ongoing training of p-net via the training module 184.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An operative structure of a neural network, the operative structure comprising:
    a plurality of inputs of the neural network, each of the respective inputs being configured to receive an input signal having an input value;
    a plurality of synapses, wherein each of the synapses is connected to one of the plurality of inputs and includes a plurality of corrective weights, wherein each of the corrective weights is defined by a weight value, and wherein each of the synapses communicates weight signals indicative of weight values of the corrective weights;
    a set of neurons, wherein each of the neurons has at least one output and is connected with at least one of the plurality of inputs via at least one of the plurality of synapses, and wherein each of the respective neurons is configured to receive the weight signals from the at least one of the plurality of synapses and add up the weight values of the corrective weights selected from each synapse connected to the respective neuron and thereby generate a neuron sum;
    a controller configured to:
        receive a desired output signal having a value, determine a deviation of the neuron sum from the desired output signal value; and
        modify respective corrective weight values using the determined deviation, such that adding up the modified corrective weight values to determine the neuron sum minimizes the deviation of the neuron sum from the desired output signal value to thereby train the neural network;
    a structure-forming module configured to selectively arrange and rearrange connections between neural network elements, including the plurality of inputs, the set of neurons, and the plurality of synapses, during the training of the neural network;
    a signal allocation module configured to distribute the input signals among the neural network elements during the training of the neural network; and
    a training module configured to command and coordinate operation of the controller, the structure-forming module, and the signal allocation module to reorganize the operative structure of the neural network during the training of the neural network to thereby control, in real-time, the training of the neural network.

2. The neural network operative structure of claim 1, wherein the signal allocation module is further configured to select one or more corrective weights from the plurality of corrective weights in correlation with the input signal value.

3. The neural network operative structure of claim 1, further comprising a set of distributors, wherein each of the distributors is operatively connected to one of the plurality of inputs for receiving the respective input signal and is configured to select one or more corrective weights from the plurality of corrective weights in correlation with the input value.

4. The neural network operative structure of claim 1, wherein the structure-forming module is additionally configured to vary a number of the inputs, a number of the neurons, and a number of the synapses during the training of the neural network.

5. The neural network operative structure of claim 4, wherein, during the training of the neural network, the structure-forming module is additionally configured to reset:
    a degree of connectivity between the inputs and the neurons;
    a number of the outputs;
    a number of the corrective weights on each respective synapse; and
    the weight values of the corrective weights.

6. The neural network operative structure of claim 1, wherein the training module is additionally configured to:
    access a testing input signal having a value and access a desired testing output signal; and
    determine a difference between the testing input signal and the desired testing output signal value during the training to thereby evaluate effectiveness of ongoing training of the neural network.

7. The neural network operative structure of claim 6, wherein the received input signals include the testing input signal.

8. The neural network operative structure of claim 6, wherein the training module is further configured to select an input signal from the received input signals, alter the selected input signal, and communicate the altered selected input signal to the controller to compare the altered selected input signal with the desired testing output signal and thereby evaluate the effectiveness of the ongoing training.

9. A method of training a neural network having an operative structure, the method comprising:
    receiving training images via a plurality of inputs to the neural network, wherein the training images are one of received as a training input value array and codified as the training input value array during training of the neural network;

organizing corrective weights of a plurality of synapses in a corrective weight array, wherein each of the synapses is connected to one of the plurality of inputs and includes a plurality of corrective weights, and wherein each of the corrective weights is defined by a weight value;

generating a neuron sum array via a plurality of neurons, wherein each of the neurons has at least one output and is connected with at least one of the plurality of inputs via at least one of the plurality of synapses, and wherein each respective neuron of the plurality of neurons is configured to add up the weight values of the corrective weights corresponding to each synapse connected to the respective neuron;

receiving, via a controller, desired images organized as a desired output value array;

determining, via the controller, a deviation of the neuron sum array from the desired output value array and generate a deviation array;

modifying, via the controller, the corrective weight array using the determined deviation array, such that adding up the modified corrective weight values to determine the neuron sum array reduces the deviation of the neuron sum array from the desired output value array to generate a trained corrective weight array and thereby facilitate concurrent training of the neural network; and selectively arranging and rearranging connections between neural network elements, including the plurality of inputs, the plurality of neurons, and the plurality of synapses, during the training of the neural network via a structure-forming module;

distributing the training images among the neural network elements via a signal allocation module during the training of the neural network; and commanding and coordinating operation of the controller, the structure-forming module, and the signal allocation module to reorganize the operative structure of the neural network during the training of the neural network via a training module, to thereby control, in real-time, the training of the neural network.

10. The method of claim 9, further comprising codifying, via the signal allocation module, the training images as the training input value array.

11. The method of claim 9, further comprising codifying, via a set of distributors, the training images as the training input value array, wherein the set of distributors is operatively connected to the plurality of inputs for receiving the respective training images.

12. The method of claim 9, further comprising varying a number of the inputs, a number of the neurons, and a number of the synapses, via the structure-forming module, during the training of the neural network.

13. The method of claim 12, further comprising, during the training of the neural network, resetting via the structure-forming module:
a degree of connectivity between the inputs and the neurons;
a number of the outputs;
a number of the corrective weights on each respective synapse; and
the weight values of the corrective weights.

14. The method of claim 9, further comprising, via the training module:
accessing an array of testing input images having respective testing input values;
accessing an array of desired testing output images having respective desired testing output values;
inputting the accessed array of testing input images and the accessed array of desired testing output images into the neural network during the training; and
determining a difference between the testing input images and the desired testing output images during the training to thereby evaluate effectiveness of ongoing training of the neural network.

15. The method of claim 14, wherein the training input value array includes the array of testing images.

16. The method of claim 14, further comprising, via the training module, selecting a training image from the received training images, altering the selected training image, and communicating the altered selected training image to the controller to compare the altered selected training image with the desired testing output image and thereby evaluate the effectiveness of the ongoing training.

17. An operative structure of a neural network, the operative structure comprising:
a plurality of inputs to the neural network configured to receive training images, wherein the training images are one of received as a training input value array and codified as the training input value array during training of the neural network;
a plurality of synapses, wherein each synapse is connected to one of the plurality of inputs and includes a plurality of corrective weights, wherein each of the plurality of corrective weights is defined by a weight value, wherein the plurality of corrective weights of the plurality of synapses are organized in a corrective weight array, and wherein each synapse communicates weight signals indicative of weight values of the respective corrective weights;
a plurality of neurons, wherein each neuron has at least one output and is connected with at least one of the plurality of inputs via at least one of the plurality of synapses, and wherein each of the plurality of neurons is configured to receive the weight signals from the at least one of the plurality of synapses and add up the weight values of the plurality of corrective weights corresponding to each of the plurality of synapses connected to the respective neuron, such that the plurality of neurons generate a neuron sum array; and
a controller configured to:
receive desired images organized as a desired output value array;
determine a deviation of the neuron sum array from the desired output value array and generate a deviation array; and
modify the corrective weight array using the determined deviation array, such that adding up the modified corrective weight values to determine the neuron sum array reduces the deviation of the neuron sum array from the desired output value array to generate a trained corrective weight array and thereby facilitate concurrent training of the neural network.

18. The neural network operative structure of claim 17, further comprising:
a structure-forming module configured to selectively arrange and rearrange connections between neural network elements, including the plurality of inputs, the plurality of neurons, and the plurality of synapses, during the training of the neural network;
a signal allocation module configured to distribute the training images among the neural network elements during the training of the neural network; and
a training module configured to command and coordinate operation of the controller, the structure-forming module, and the signal allocation module to reorganize the operative structure of the neural network during the training of the neural network to thereby control, in real-time, the training of the neural network.

19. The neural network operative structure of claim 18, wherein the signal allocation module is further configured to codify each of the training images and input images as the respective training input value array and input value array.

20. The neural network operative structure of claim 18, wherein the structure-forming module is additionally configured to vary a number of the inputs, a number of the neurons, and a number of the synapses during the training of the neural network.

* * * * *